(12) United States Patent
Namou et al.

(10) Patent No.: US 9,096,134 B2
(45) Date of Patent: Aug. 4, 2015

(54) ENHANCED HV PRE-CHARGE HEATER DIAGNOSTIC DETECTION SYSTEM FOR LIQUID COOLED HV BATTERY PACKS

(75) Inventors: Andrew J. Namou, Southfield, MI (US); Russell K. Steele, Clinton Township, MI (US); Michael E. Barton, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 757 days.

(21) Appl. No.: 13/357,267

(22) Filed: Jan. 24, 2012

(65) Prior Publication Data
US 2013/0188665 A1   Jul. 25, 2013

(51) Int. Cl.
  *G01N 25/00*   (2006.01)
  *B60L 11/18*   (2006.01)
  *H01M 10/0525*   (2010.01)
  *H01M 10/48*   (2006.01)
  *H01M 10/615*   (2014.01)
  *H01M 10/625*   (2014.01)
  *H01M 10/63*   (2014.01)
  *H01M 8/02*   (2006.01)
  *H01M 10/6567*   (2014.01)
  *B60L 3/00*   (2006.01)

(52) U.S. Cl.
  CPC ............... *B60L 11/18* (2013.01); *B60L 3/0046* (2013.01); *B60L 11/187* (2013.01); *H01M 8/0202* (2013.01); *H01M 10/0525* (2013.01); *H01M 10/486* (2013.01); *H01M 10/502* (2013.01); *H01M 10/5006* (2013.01); *H01M 10/5016* (2013.01); *H01M 10/5075* (2013.01); *Y02E 60/122* (2013.01); *Y02E 60/50* (2013.01); *Y02T 10/7011* (2013.01)

(58) Field of Classification Search
  CPC ..... B60L 11/18; B60L 3/0046; B60L 11/187; H01M 10/486; H01M 10/5075; H01M 10/5016; H01M 10/5006; H01M 8/0202; H01M 10/502; H01M 10/0525; Y02E 60/122; Y02E 60/50; Y02T 10/7011
  USPC .......................... 374/14, 185, 5, 57, 141, 102
  See application file for complete search history.

(56) References Cited

U.S. PATENT DOCUMENTS

2011/0246007 A1*  10/2011  Choi et al. ........................ 701/22
2012/0040224 A1*   2/2012  Reischmann et al. ........ 429/120

* cited by examiner

*Primary Examiner* — Lisa Caputo
*Assistant Examiner* — Janice M Soto
(74) *Attorney, Agent, or Firm* — John A. Miller; Miller IP Group, PLC

(57) ABSTRACT

A system and method for determining whether a resistor in a battery circuit on an electric vehicle cannot be used as a resistive heater for heating a cooling fluid for cooling the vehicle battery, but can used as a pre-charge resistor for starting the vehicle. A temperature sensor is provided proximate the resistor within the cooling fluid. The method turns on the resistor before turning on a coolant pump and samples the temperature at sample intervals over a predetermined period of time. The method then calculates an integral or differential of the sampled temperatures and compares that value with a calibrated threshold. If the temperature value is not greater than the threshold, meaning that the temperature indicates no cooling fluid is present, the algorithm disables the resistor for heating purposes, but maintains operation of the resistor for pre-charge purposes.

20 Claims, 2 Drawing Sheets

ENHANCED HV PRE-CHARGE HEATER DIAGNOSTIC DETECTION SYSTEM FOR LIQUID COOLED HV BATTERY PACKS

BACKGROUND OF THE INVENTION

1. Field of the Invention

This invention relates generally to a detection system for detecting possible failure of a heater for heating a vehicle battery and, more particularly, to a detection system for determining whether a heater in a battery circuit on a vehicle cannot be used to heat a cooling fluid for a liquid cooled battery, but can be used as a pre-charge resistor for vehicle soft starts.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium ion, nickel metal hydride, lead acid, etc. A typical high voltage battery for an electric vehicle may include 196 battery cells providing about 400 volts of power. The battery can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in parallel. Different vehicle designs include different battery designs that employ various trade-offs and advantages for a particular application.

The high voltage battery in an electric vehicle is selectively coupled to the vehicle's high voltage bus by battery contactors. When the vehicle is shut off, the contactors are opened and the battery is disconnected from the high voltage bus. When the vehicle is switched on, the contactors are closed and the battery voltage is coupled to the high voltage bus.

Several other high voltage components are electrically coupled to the high voltage bus, including a traction motor inverter module (TPIM) that inverts the DC high voltage bus signal to an AC signal suitable for the AC propulsion motors in the vehicle. The TPIM and other modules and circuits coupled to the high voltage bus generally include a relatively large capacitor coupled across the positive and negative lines of the high voltage bus that filter bus voltage noise that may otherwise have a degrading effect on the performance of the module. However, as the battery contactors are being closed and the battery voltage is coupled to the high voltage bus lines, these capacitors act as a direct short across the bus lines until the capacitor has had an opportunity to charge, which is generally only a few milliseconds. This limited time direct short has a degrading effect on many of the electrical components in the system as a result of the high voltage, including the capacitor itself and the contactors, which limits their life.

In order to eliminate or reduce this current spike from the direct short at system start-up, it is known to provide a pre-charge resistor in the battery circuit that operates as a load to limit the current while the several capacitors are being charged. In other words, the pre-charge resistor pre-charges the vehicle's high voltage bus prior to closing the main bus contactors during vehicle start-up in order to avoid high inrush current spikes that may otherwise damage the high voltage capacitors. In one particular design, a negative battery contactor is closed at start-up and the pre-charge resistor is coupled across the positive bus contactor, which remains open until the pre-charge function is completed.

It is well known in the industry that high temperatures can be detrimental to a vehicle battery, and that most types of battery packs produce heat when being discharged during vehicle driving operation. It is also known that the life of a lithium-ion battery pack is a function of both temperature and state-of-charge of the battery pack, where high temperatures may be detrimental to battery pack life if those temperatures occur when the battery pack is in a high state-of-charge. Therefore, electric vehicles may employ a thermal management system to maintain battery pack temperature at a certain temperature that is known to extend battery pack life. The battery thermal management system typically includes a cooling system through which a cooling fluid flows that is directed around the battery in some manner to draw heat away from the battery. An electric heater is generally provided somewhere within the cooling fluid that heats the cooling fluid to raise the temperature of the battery to an optimal temperature during cold operating conditions for better performance.

U.S. patent application Ser. No. 12/853,695, filed Aug. 10, 2010, titled Combined Heating and Pre-charging Function and Hardware for Propulsion Batteries, assigned to the assignee of this Application and herein incorporated by reference, discloses a battery circuit that employs a resistive element for heating the cooling fluid for a liquid cooled battery on a vehicle, where the resistor is also used as a pre-charge resistor for starting the vehicle.

There is a drawback with using a single resistor for both the battery heating function and the pre-charge function where if the resistor becomes damaged or otherwise fails, then the vehicle is unable to be started because it cannot perform the pre-charge function. For example, if the liquid cooling system on a vehicle ruptures or otherwise leaks, where the cooling fluid drains out, and the heating resistor is subsequently turned on, the resistor would likely fail because its temperature will increase to a damaging level as a result of not being within the cooling fluid. In this situation, the battery may otherwise be operational, but at a lower performance. However, since the pre-charge function is not operational, the vehicle will not be able to be started, possibly resulting in a walk-home condition.

SUMMARY OF THE INVENTION

In accordance with the teachings of the present invention, a system and method are disclosed for determining whether a resistor in a battery circuit on an electric vehicle cannot be used as a resistive heater for heating a cooling fluid for cooling the vehicle battery, but can used as a pre-charge resistor for starting the vehicle. A temperature sensor is provided proximate the resistor within the cooling fluid. The method turns on the resistor before turning on a coolant pump and samples the temperature at sample intervals over a predetermined period of time. The method then calculates an integral or differential of the sampled temperatures and compares that value with a first calibrated threshold. If the temperature value is not greater than the threshold, meaning that the temperature indicates no cooling fluid is present, the algorithm disables the resistor for heating purposes, but maintains operation of the resistor for pre-charge purposes. The algorithm then turns on the coolant pump and records temperature measurements over a predetermined period of time. The algorithm then compares the new temperature measurements to another calibrated threshold, where if the new temperature value is less than the threshold the algorithm indicates no cooling fluid flow and a pump failure.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining whether a resistive element that provides heating for a liquid cooled battery and system pre-charge can be used as a pre-charge resistor for starting a vehicle but cannot be used as a resistive heater for heating a cooling fluid for the vehicle battery is merely exemplary in nature, and is in no way intended to limit the invention or its applications or uses.

Figure 1:
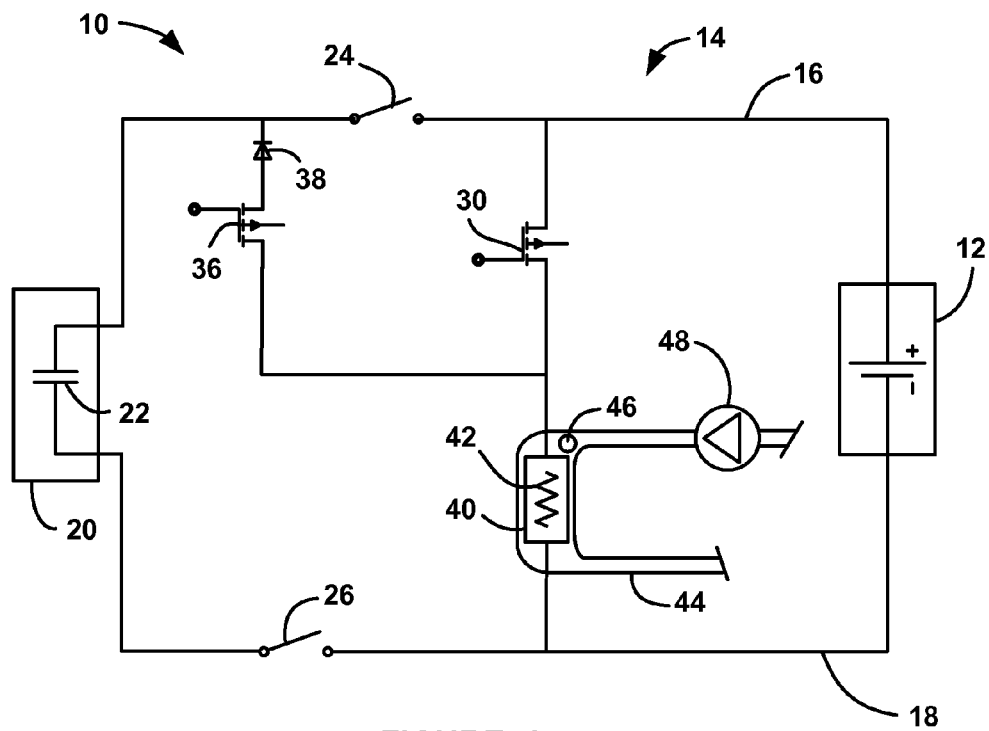
FIG. 1 is a schematic diagram of a battery circuit for an electric vehicle that employs a single resistor that provides both a pre-charge function and a heating function.

FIG. 1 is a simplified schematic diagram of a known battery circuit 10 including a battery 12 and a battery disconnect unit (BDU) 14. The battery 12 can be any battery suitable for the purposes described herein, such as a nickel metal hydride battery, a lithium-ion battery, a lead-acid battery, etc., that is liquid cooled. The battery 12 includes a plurality of battery cells electrically coupled in series and/or in parallel to provide the desired high voltage for this particular application. The battery 12 is electrically coupled to a high voltage bus shown here as a combined positive bus line 16 and negative bus line 18. Various high voltage components would be electrical coupled to the bus lines 16 and 18 for the particular application. In the circuit 10, one of those components is a TPIM 20 that couples the high voltage on the bus lines 16 and 18 to an AC traction motor (not shown). Other high voltage electrical components would also be coupled to the bus lines 16 and 18, although not specifically shown. As mentioned above, the electrical components that are coupled to the high voltage bus lines 16 and 18 typically include a capacitor to filter bus noise, where a capacitor 22 is provided in the TPIM 20 as an illustration of this.

The positive bus line 16 includes a positive battery contactor or switch 24, such as a relay, and the negative bus line 18 includes a negative contactor or switch 26, where the switches 24 and 26 selectively connect and disconnect the battery 12 to the high voltage bus on the vehicle in a manner that is well understood by those skilled in the art.

As mentioned above, some battery thermal management systems employ heaters to raise the temperature of the battery 12 to a desirable operating temperature. The circuit 10 includes a resistive electric heater 40 having a resistor 42 for this purpose that is electrically coupled across the bus lines 16 and 18. A portion of a thermal management system is shown in FIG. 1 and includes a cooling fluid line 44 through which a suitable cooling fluid flows as caused by a pump 48, where the electric heater 40 is positioned within the line 44 so that the cooling fluid flows around the resistor 42, and is able to heat the cooling fluid when desired. An FET switch 30 selectively turns on the heater 40 when it receives a signal at its gate terminal to close the switch 30 through suitable high voltage isolation circuitry (not shown), as is well understood by those skilled in the art. A temperature sensor 46 measures the temperature of the cooling fluid in the line 44 proximate the heater 40.

The resistor 42 also operates as a pre-charge resistor such as disclosed in the '695 application referenced above. When used as a pre-charge resistor, the resistor 42 can be selectively coupled to the positive bus line 16 by an FET switch 36 that receives a logic signal at its gate terminal through appropriate high voltage isolation electronics (not shown) to close the switch 36. A high voltage blocking diode 38 prevents current flow from the positive bus line 16 to the resistor 42 when the switch 24 is closed during operation of the system. As discussed above, when the resistor 42 is used as a pre-charge resistor it provides a load at system start-up when the capacitor 22, and other capacitors, provide a direct short across the bus lines 16 and 18 to prevent further damage to the capacitor 22, the switches 24 and 26, and other electrical components.

Both of the switches 36 and 30 cannot be closed at the same time. If both heating and pre-charging are desired at the same time, then the pre-charge function would take precedent where the switch 30 would be open. This is because the pre-charge operation would be very quick, typically on the order of less than 300 milliseconds. Once the pre-charge operation was completed, then the switch 36 would be opened and the switch 30 would be closed to provide the heating function, if desired.

The resistance of the resistor 42 can be selected for the desired and proper heating, which would typically be a higher resistance than is necessary for the pre-charge function. The time frame for providing the pre-charge function could be increased to provide the proper pre-charging for the desired heating resistance. Alternately, if it was desirable to keep the pre-charge time the same, then the resistance of the resistor 42 could be reduced, which would reduce its heating capacity. Also, the control of the switch 30 to provide the heating is typically provided by a pulse width modulation (PWM) signal having a certain duty cycle. That duty cycle pulse could be decreased for the smaller resistance to provide the same amount of heating.

Figure 2:
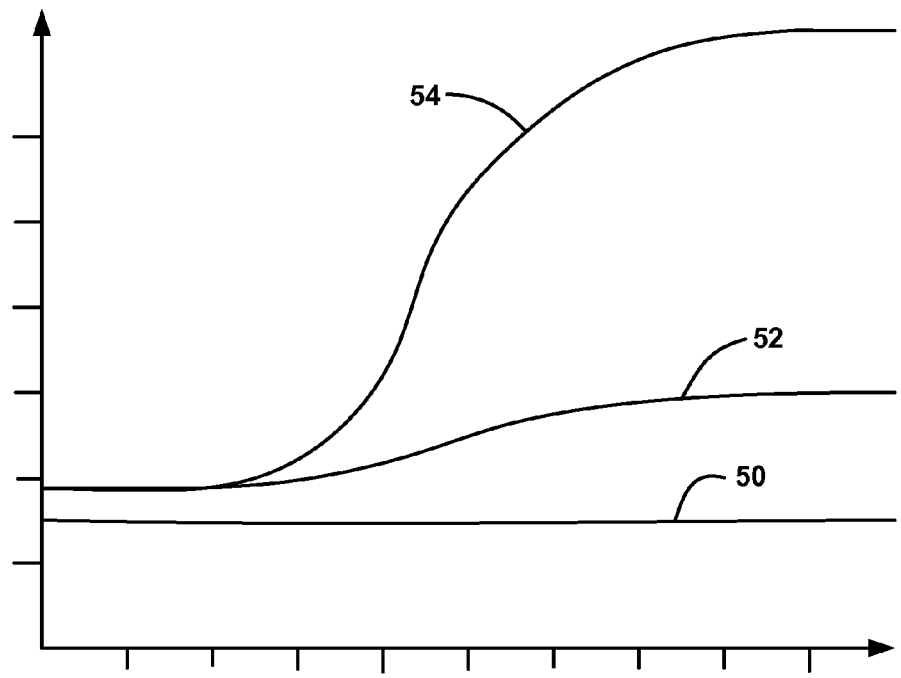
FIG. 2 is a graph with time on the horizontal axis and temperature measurements on the vertical axis showing the relationship between a cooling fluid temperature where the cooling fluid is flowing, no cooling fluid is present and the cooling fluid is not flowing.

FIG. 2 is a graph with time on the horizontal axis and temperature on the vertical axis showing a relationship between the temperature of the cooling fluid provided by the temperature sensor 46 when the heater 40 is on and the cooling fluid is flowing at graph line 50, when there is no cooling fluid in the line 44, but the pump 48 is on at graph line 52, and when there is cooling fluid in the line 44, but the cooling fluid is not flowing because the pump 48 has failed at graph line 54. As is apparent, there is a large difference between the temperature detected by the temperature sensor 46 when there is no cooling fluid in the line 44 and when there is no cooling fluid flow in the line 44.

Figure 3:
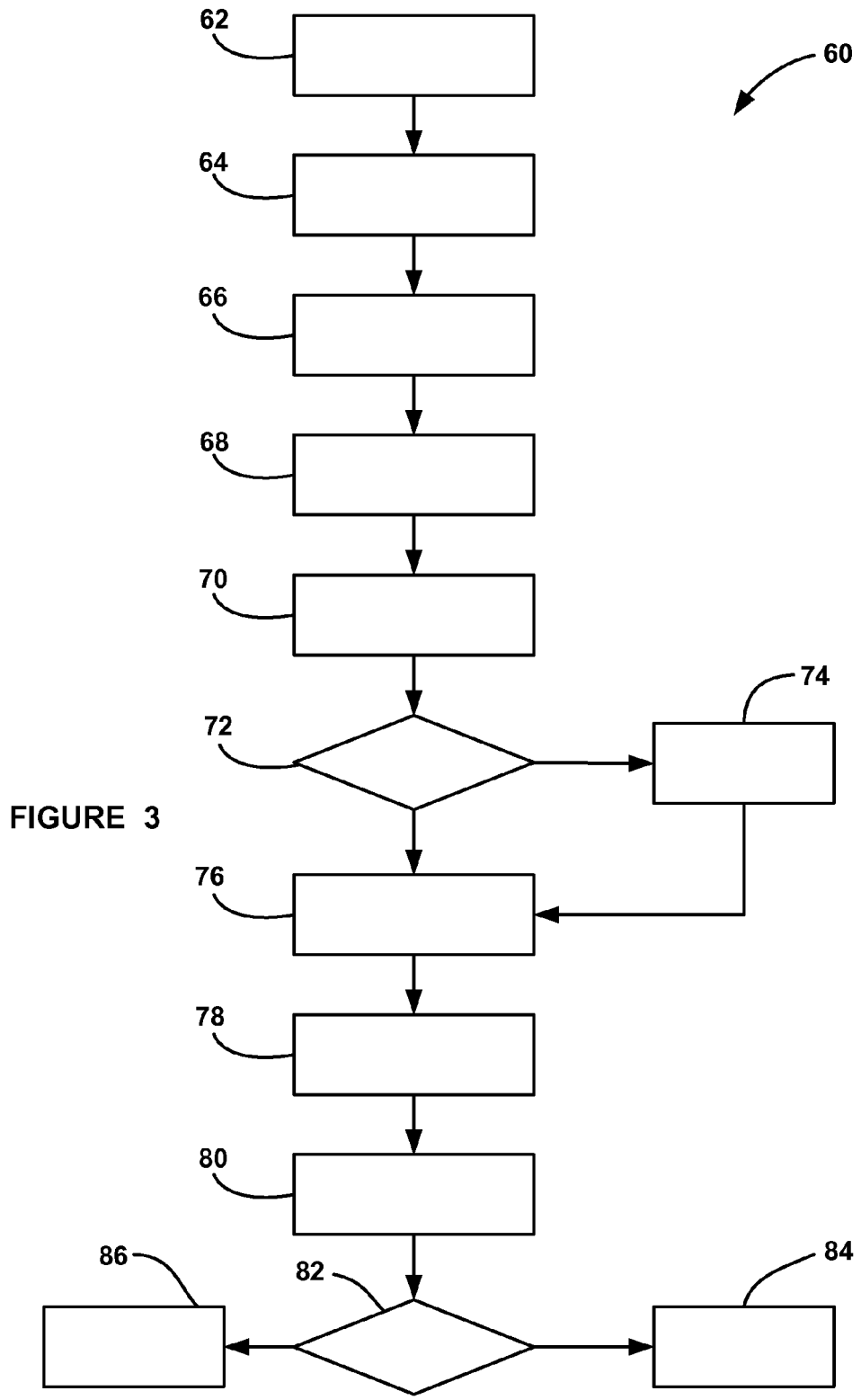
FIG. 3 is a flow chart diagram showing a method for determining whether a resistive element that provides both battery heating and system pre-charge cannot be used as a heater, but can be used as a pre-charge resistor.

FIG. 3 is a flow chart diagram 60 showing an operation of an algorithm for determining whether the resistor 42 can be used as a pre-charge resistor, but cannot be used as a cooling fluid heater. The algorithm is a diagnostic tool that is run at a suitable time, such as at vehicle start-up. At the beginning of the diagnostic, the pump 48 is off so that no cooling fluid is flowing through the line 44, but it is not yet known whether there is cooling fluid in the line 44. The algorithm reads an output from the temperature sensor 46 at box 62, and then turns on the resistor 42 for a predetermined set short duration of time, such as 1 to 5 seconds, in a high power heating mode at box 64. During the time that the resistor 42 is on, the algorithm records temperature measurements from the sensor 46 at predetermined sample intervals at box 66, where the time that the algorithm records temperature measurements is less than the time the resistor 42 is on.

The algorithm then calculates a representative temperature value of the recorded temperature measurements, such as integral value or a differential value, at box 68. That calculated temperature value is then compared to a calibrated threshold value stored in a look-up table at box 70, where the threshold value can be defined at a suitable location between the graph lines 52 and 54. At decision diamond 72, if the calculated temperature value is not greater than the threshold value, meaning the calculated value falls below the graph line 54 for the temperature of a non-flowing cooling fluid, then the algorithm knows that there is a problem, possibly a failed heater or little or no cooling fluid present in the line 44. Particularly, the algorithm will know that the recorded temperatures are on the graph line 52 for no cooling fluid because the pump 48 has not been turned on, which otherwise would indicate that the temperature is on the graph line 50. The algorithm will then disable the resistor 42 to be used as a heater, but maintains the use of the resistor 42 as a pre-charge resistor at box 74.

Once the algorithm determines whether the resistor 42 can be used as both a cooling fluid heater and a pre-charge resistor or that the resistor 42 can only be used as a pre-charge resistor, the algorithm can then determine whether the pump 48 is operating properly. The algorithm can perform this second diagnostic for both situations where the calculated temperature value is greater than the threshold at the decision diamond 72 and that the resistor 42 has been disabled as a heater at the box 74. With the resistor 42 still on, the algorithm turns on the pump 48 at box 76, and then again records temperature measurements at sample intervals for a certain period of time at box 78. The algorithm can also calculate an integral or differential value of the recorded temperature measurements for the period of time as was done above at the box 68 to obtain a second calculated temperature value. The algorithm then compares the second calculated temperature value to a second threshold value that can be defined at a suitable location between the graph lines 50 and 52 or the graph lines 50 and 54. At decision diamond 82, the algorithm determines if the temperature value is less than the second threshold value, and if not, the algorithm will indicate a failed pump at box 86 because the algorithm will know that the recorded temperature measurements are on the graph line 54. If the temperature value is less than the second threshold value at the decision diamond 82, then the algorithm passes the diagnostics for an operational heater and pump at box 84 because the algorithm will know that the recorded temperature measurements are on the graph line 50.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a resistive element can be used as a pre-charge resistor in a vehicle battery circuit, but cannot be used for heating a cooling fluid that cools a battery associated with the battery circuit, said method comprising:
    turning on the resistive element for a predetermined period of time;
    providing temperature measurement signals at sample intervals from a temperature sensor that measures the temperature of the cooling fluid proximate to the resistive element during the predetermined period of time;
    determining a first temperature value based on the temperature measurement signals;
    comparing the first temperature value to a first threshold value;
    indicating that the resistive element has failed or no cooling fluid is present if the first temperature value is not greater than the first threshold value;
    disabling the resistor so that it may not be used for heating the cooling fluid if the resistive element has failed or no cooling fluid is present;
    turning on a cooling fluid pump that pumps the cooling fluid through a line and around the resistive element;
    again providing temperature measurements signals at sample intervals from the temperature sensor during the predetermined period of time;
    determining a second temperature value based on the temperature measurement signals;
    comparing the second temperature value to a second threshold value; and
    determining that the pump is not operating properly if the second temperature value is greater than the second threshold value.

2. The method according to claim 1 wherein the first threshold value is between a value that indicates there is no cooling fluid in the line and a value that indicates that there is cooling fluid in the line but it is not flowing.

3. The method according to claim 1 wherein the second temperature threshold is between a value that indicates there is no cooling fluid flow in the line and there is cooling fluid flow in the line.

4. The method according to claim 1 wherein the predetermined period of time is in the range of 1-5 seconds.

5. The method according to claim 1 wherein determining a first temperature value and a second temperature value includes calculating an integral value of temperature measurement signals or calculating a differential value of the temperature measurement signals.

6. The method according to claim 1 wherein the battery is a lithium-ion battery.

7. A method for determining whether a resistive element can be used as a pre-charge resistor in a vehicle battery circuit, but cannot be used for heating a cooling fluid that cools a battery associated with the battery circuit, said method comprising:
    turning on the resistive element for a predetermined period of time;

providing temperature measurement signals at sample intervals from a temperature sensor that measures the temperature of the cooling fluid proximate to the resistive element during the predetermined period of time;

determining a first temperature value based on the temperature output signals;

comparing the first temperature value to a first threshold value; and indicating that the resistive element has failed or no cooling fluid is present in the line based on whether the first temperature value is less than or greater than the first threshold value; and disabling the resistor so that it may not be used for heating the cooling fluid if the resistive element has failed or no cooling fluid is present.

8. The method according to claim 7 wherein the first threshold value is between a value that indicates there is no cooling fluid in the line and value that indicates that there is cooling fluid in the line but it is not flowing.

9. The method according to claim 7 further comprising turning on a cooling fluid pump that pumps the cooling fluid through a line and around the resistive element, reading the temperature measurement signals from the temperature sensor during the predetermined period time, determining a second temperature value based on the temperature measurement signals, comparing the second temperature value to a second threshold value, determining that the pump is not operating properly if the second temperature value is greater than the second threshold value.

10. The method according to claim 9 wherein the second temperature threshold is between a value that indicates there is no cooling fluid flow in the line and there is a flowing cooling fluid in the line.

11. The method according to claim 7 wherein the predetermined period of time is in the range of 1-5 seconds.

12. The method according to claim 7 wherein determining a first temperature value includes calculating an integral value of the temperature measurement signals or calculating a differential value of the temperature measurement signals.

13. The method according to claim 7 wherein the battery is a lithium-ion battery.

14. A system for determining whether a resistive element can be used as a pre-charge resistor in a vehicle battery circuit, but cannot be used for heating a cooling fluid that cools a battery associated with the battery circuit, said system comprising:

means for turning on the resistive element for a predetermined period of time;

means for providing temperature measurement signals at sample intervals from a temperature sensor that measures the temperature of the cooling fluid proximate to the resistive element during the predetermined period of time;

means for determining a first temperature value based on the temperature output signals;

means for comparing the first temperature value to a first threshold value;

means for indicating that the resistive element has failed or no cooling fluid is present if the first temperature value is less than or greater than the first threshold value; and means for disabling the resistor so that is may not be used for heating the cooling fluid if the resistive element has failed or no cooling fluid is present.

15. The system according to claim 14 wherein the first threshold value is between a value that indicates there is no cooling fluid in the line and value that indicates that there is cooling fluid in the line but it is not flowing.

16. The system according to claim 14 further comprising means for turning on a cooling fluid pump that pumps the cooling fluid through a line and around the resistive element, means for reading the temperature measurement signals from the temperature sensor during the predetermined period time, means for determining a second temperature value based on the temperature measurement signals, means for comparing the second temperature value to a second threshold value, means for determining that the pump is not operating properly if the second temperature value is greater than the second threshold value, and means for determining that the pump is operating properly if the second temperature value is less than the second threshold value.

17. The system according to claim 16 wherein the second temperature threshold is between a value that indicates there is no cooling fluid flow in the line and there is a flowing cooling fluid in the line.

18. The system according to claim 14 wherein the predetermined period of time is in the range of 1-5 seconds.

19. The system according to claim 14 wherein the means for determining a first temperature value calculates an integral value of the temperature measurement signals or calculates a differential value of the temperature measurement signals.

20. The system according to claim 14 wherein the battery is a lithium-ion battery.

* * * * *